United States Patent

Soderquist et al.

[11] Patent Number: 5,836,608
[45] Date of Patent: Nov. 17, 1998

[54] AIRBAG DEFLECTION MOUNT

[75] Inventors: Quin Soderquist, South Weber; Richard W. Carr, Brigham City, both of Utah

[73] Assignee: Morton International, Inc., Chicago, Ill.

[21] Appl. No.: 763,478

[22] Filed: Dec. 11, 1996

[51] Int. Cl.$^6$ ................................................. B60R 21/26
[52] U.S. Cl. ...................................... 280/728.2; 280/740
[58] Field of Search ........................ 280/728.2, 736, 280/740, 741, 742

[56] References Cited

U.S. PATENT DOCUMENTS

| | | | |
|---|---|---|---|
| 4,068,862 | 1/1978 | Ishi et al. | 280/740 |
| 4,178,017 | 12/1979 | Ishi et al. | 280/740 |
| 4,183,550 | 1/1980 | Sudou | 280/743 |
| 4,830,401 | 5/1989 | Honda | 280/736 |
| 4,902,036 | 2/1990 | Zander et al. | 280/736 |
| 5,193,846 | 3/1993 | Allard | 280/728 |
| 5,246,249 | 9/1993 | Satoh | 280/731 |
| 5,308,110 | 5/1994 | Kokeguchi | 280/728.2 |
| 5,378,011 | 1/1995 | Rogerson et al. | 280/728.1 |
| 5,382,046 | 1/1995 | Cuevas | 280/728.2 |
| 5,462,305 | 10/1995 | Hamada | 280/728.2 |
| 5,505,488 | 4/1996 | Allard | 280/740 |
| 5,509,685 | 4/1996 | Boyle, III | 280/728.2 |
| 5,542,692 | 8/1996 | Shaklik et al. | 280/728.2 |
| 5,542,693 | 8/1996 | Koide | 280/728.2 |
| 5,562,303 | 10/1996 | Schleicher et al. | 280/736 |
| 5,615,907 | 4/1997 | Stanger | 280/728.2 |
| 5,658,008 | 8/1997 | Herrmann et al. | 280/728.2 |
| 5,683,100 | 11/1997 | Enders | 280/728.2 |

FOREIGN PATENT DOCUMENTS

| | | |
|---|---|---|
| A13604843 | 8/1987 | Germany . |
| 3157241 | 7/1991 | Japan .................................. 280/736 |
| 405124482 | 5/1993 | Japan .................................. 280/736 |

*Primary Examiner*—Charles T. Jordon
*Assistant Examiner*—Christopher K. Montgomery
*Attorney, Agent, or Firm*—George W. Rauchfuss, Jr.

[57] ABSTRACT

An airbag deflection mount for mounting an airbag cushion to an airbag module and for deflecting hot inflation gas away from a throat of the airbag cushion. The airbag deflection mount includes a generally flat retainer ring for securing a collar of the airbag cushion around an inflator of the airbag module that produces and expels the inflation gas from a plurality of inflation ports for inflating the airbag cushion upon a vehicle collision. The airbag deflection mount also includes a plurality of deflectors extending upwardly from the retainer ring and positionable, spaced-apart from the inflator, between the plurality of inflation ports of the inflator and the throat of the airbag cushion. The plurality of deflectors deflect hot inflation gas away from the throat of the airbag cushion and substantially prevent the throat of the airbag cushion from being burned by the hot inflation gas.

20 Claims, 6 Drawing Sheets

AIRBAG DEFLECTION MOUNT

FIELD OF THE INVENTION

The present invention relates to an airbag module and, more particularly, to an airbag deflection mount for mounting an airbag cushion within the airbag module and for deflecting hot inflation gas away from the throat of the airbag cushion.

BACKGROUND OF THE INVENTION

An airbag module is employed in a vehicle, particularly an automobile, for protecting an occupant against injury by deploying an inflated airbag cushion to physically restrain the occupant's body when the vehicle encounters a collision. A driver side airbag module is normally mounted within a steering wheel of a vehicle and includes an airbag cushion, an inflator for inflating the airbag cushion upon receiving a signal from a remote collision sensor, and a module baseplate mounting the airbag cushion and the inflator. The inflator is secured to the module baseplate and has a cylindrical sidewall defining a plurality of inflation ports for expelling inflation gas. The airbag cushion includes a throat surrounding the inflator sidewall and having a collar positioned on the baseplate. An airbag retainer ring is positioned on the collar of the airbag cushion and secured to the baseplate with the collar of the airbag cushion clamped therebetween.

During inflation of the airbag cushion, hot inflation gas exits the inflator radially in generally concentrated streams through the inflation ports in the inflator sidewall. It has been found that the hot inflation gas radially exiting the inflator can burn the throat of the airbag cushion extending from the collar and surrounding the inflator sidewall.

In order to avoid burning the airbag cushion, some airbag retainer rings include a continuous perpendicular sidewall extending up at least to a height equal with the inflation ports of the inflator for deflecting the inflation gas to protect the throat of the airbag cushion. The perpendicular sidewall intercepts the inflation gas and directs the inflation gas parallel with the inflator sidewall and generally axially into the airbag cushion.

While it is preferable that the inflation gas is directed away from the throat of the airbag cushion, it is also preferable that at least some of the inflation gas is directed radially away from the inflator into the airbag cushion. Inflation gas directed radially into the airbag cushion usually causes the airbag cushion to evenly inflate over the steering wheel and be fully inflated before an occupant is carried, by the force of deceleration caused by a collision of the vehicle, into the fully inflated and correctly positioned airbag cushion. In contrast, it has been found that inflation gas directed axially into the airbag cushion can cause the airbag cushion to be skewered or unevenly inflated. Skewered inflation is unwanted because it can cause the top of airbag cushion to strike the occupant before being fully inflated. Skewered inflation can also cause the airbag cushion to push the occupant to the side of the inflating airbag cushion so that the occupant does not receive the protection of the inflated airbag cushion. Skewered inflation additionally places severe stress on the throat and the collar of the airbag cushion.

In order to reduce the chances of skewered inflation of the airbag cushion, some airbag retainer rings include an outwardly sloping sidewall as opposed to a perpendicular sidewall. The outwardly sloping sidewall intercepts and directs the inflation gas both axially and radially into the airbag cushion and, therefore, reduces the chances of skewered inflation. The outwardly sloping sidewall, however, does not reduce cushion burning as well as the perpendicular sidewall. Accordingly, an airbag cushion used with a airbag retainer ring having an outwardly sloping sidewall may still need to incorporate such features as a cushion tether to combat skewered inflation of the airbag cushion, and protective layers of material positioned around the inside of its throat to combat cushion burning.

It would be useful, therefore, to provide a cushion retainer that protects an airbag cushion from burning yet directs inflation gas into the airbag cushion such that the airbag cushion does not skewer upon inflation.

SUMMARY OF THE INVENTION

A general object, therefore, of the present invention is to provide a new and improved airbag module.

A more specific object of the present invention is to provide a new and improved airbag retainer ring.

Another object of the present invention is to provide an airbag retainer ring that protects an airbag cushion from the hot inflation gases of an inflator.

An additional object of the present invention is to provide an airbag retainer ring that does not encourage skewered inflation of an airbag cushion.

In general, the present invention provides an airbag deflection mount for mounting an airbag cushion to an airbag module also including an inflator having a sidewall defining a plurality of spaced-apart inflation ports and a module baseplate surrounding the inflator sidewall below the plurality of inflation ports. The airbag cushion includes a throat surrounding the inflator sidewall and having a collar seated on the module baseplate so that inflation gas exiting the inflation ports of the inflator will inflate the airbag cushion.

The airbag deflection mount includes a retainer ring receivable over the collar of the airbag cushion, and securable to the module baseplate with the collar of the airbag cushion clamped therebetween. The airbag deflection mount also includes a plurality of spaced-apart deflectors which, when the retainer ring is secured to the module baseplate, extend upwardly from the retainer ring to distal ends positioned between a top of the inflator sidewall and the plurality of inflation ports. The plurality of deflectors are deployed between the inflator sidewall and the throat of the airbag cushion to substantially deflect hot inflation gas and solid particles exiting the plurality of inflation ports of the inflator away from the throat of the airbag cushion.

According to one aspect of the present invention, the retainer ring is generally flat and the plurality of spaced-apart deflectors extend perpendicular to the retainer ring.

According to another aspect of the present invention, the plurality of spaced-apart deflectors are equal to the plurality of inflation ports and are positioned so that, when the retainer ring is secured to the baseplate, the plurality of spaced-apart deflectors are aligned with the plurality of spaced-apart inflation ports. According to an additional aspect of the present invention, the retainer ring is generally flat and each of the plurality of deflectors substantially slopes outwardly with respect to the retainer ring. According to a further aspect of the present invention, each of the plurality of deflectors has a transverse convex surface facing the inflation ports.

According to still another aspect of the present invention, the plurality of deflectors comprise four deflectors and each of the four deflectors is elongated with respect to the height of the deflectors. The distal ends of each of the four deflectors flare outwardly from a center of the deflector, which is substantially perpendicular to the retainer ring, to opposing inclined side edges.

According to an additional aspect of the present invention, the airbag deflection mount further comprises an outer sidewall extending upwardly from the retainer ring to a top sidewall edge that, when the retainer ring is secured to the baseplate, is positioned above the plurality of inflation ports. The outer sidewall surrounding the plurality of deflectors substantially deflects any hot inflation gas and solid particles passing between the plurality of deflectors. According to a further aspect of the present invention, the outer sidewall defines a plurality of spaced-apart cutouts extending downwardly from the top sidewall edge. The spaced-apart cutouts divide the outer sidewall into a plurality of spaced-apart baffles offset from the plurality of deflectors.

According to another aspect of the present invention, the airbag deflection mount further includes a continuous basewall extending upwardly from the retainer ring and sized to extend below the plurality of inflation ports when the retainer ring is secured to the baseplate, with the plurality of deflectors extending upwardly from the basewall.

The present invention also provides an airbag module including an airbag deflection mount as described above. The airbag module further includes an inflator having a sidewall defining a plurality of spaced-apart inflation ports, a module baseplate surrounding the inflator sidewall below the plurality of inflation ports, and an airbag cushion including a throat surrounding the inflator sidewall and having a collar received on the module baseplate so that inflation gas exiting the inflation ports will inflate the airbag cushion.

The retainer ring of the airbag baffle mount is received over the collar of the airbag cushion and secured to the module baseplate with the collar of the airbag cushion clamped therebetween. The plurality of deflectors are deployed between the inflator sidewall and the throat of the airbag cushion, with the distal ends of the deflectors positioned between a top of the inflator sidewall and the plurality of inflation ports, to substantially deflect hot inflation gas and solid particles exiting the plurality of inflation ports of the inflator away from the throat of the airbag cushion.

The present invention, thereby, provides airbag deflection mounts that substantially prevent the throat of the airbag cushion from being burned. In addition, it has been found that the airbag deflection mounts according to the present invention do not encourage skewered inflation of the airbag cushion.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
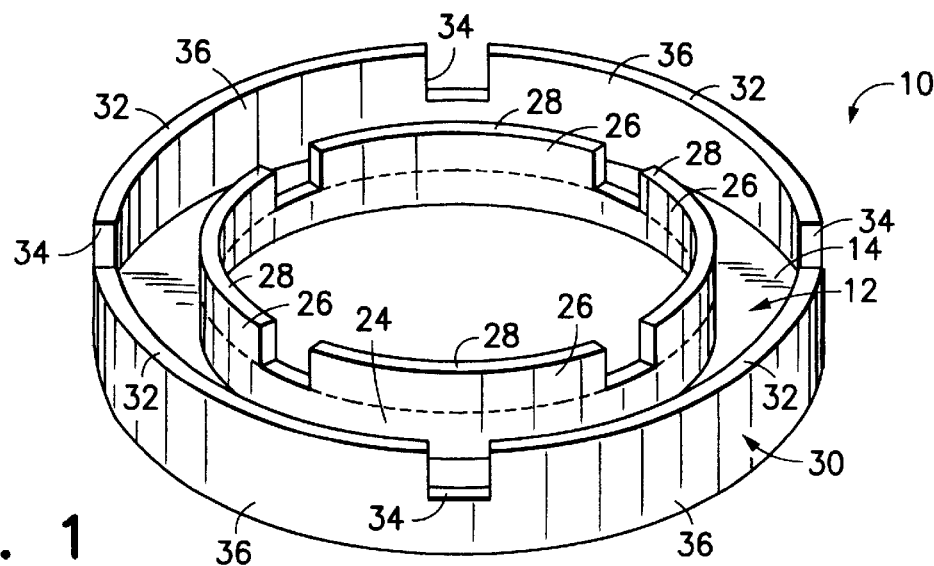
FIG. 1 is a perspective view of an airbag deflection mount according to the present invention.
Figure 2:
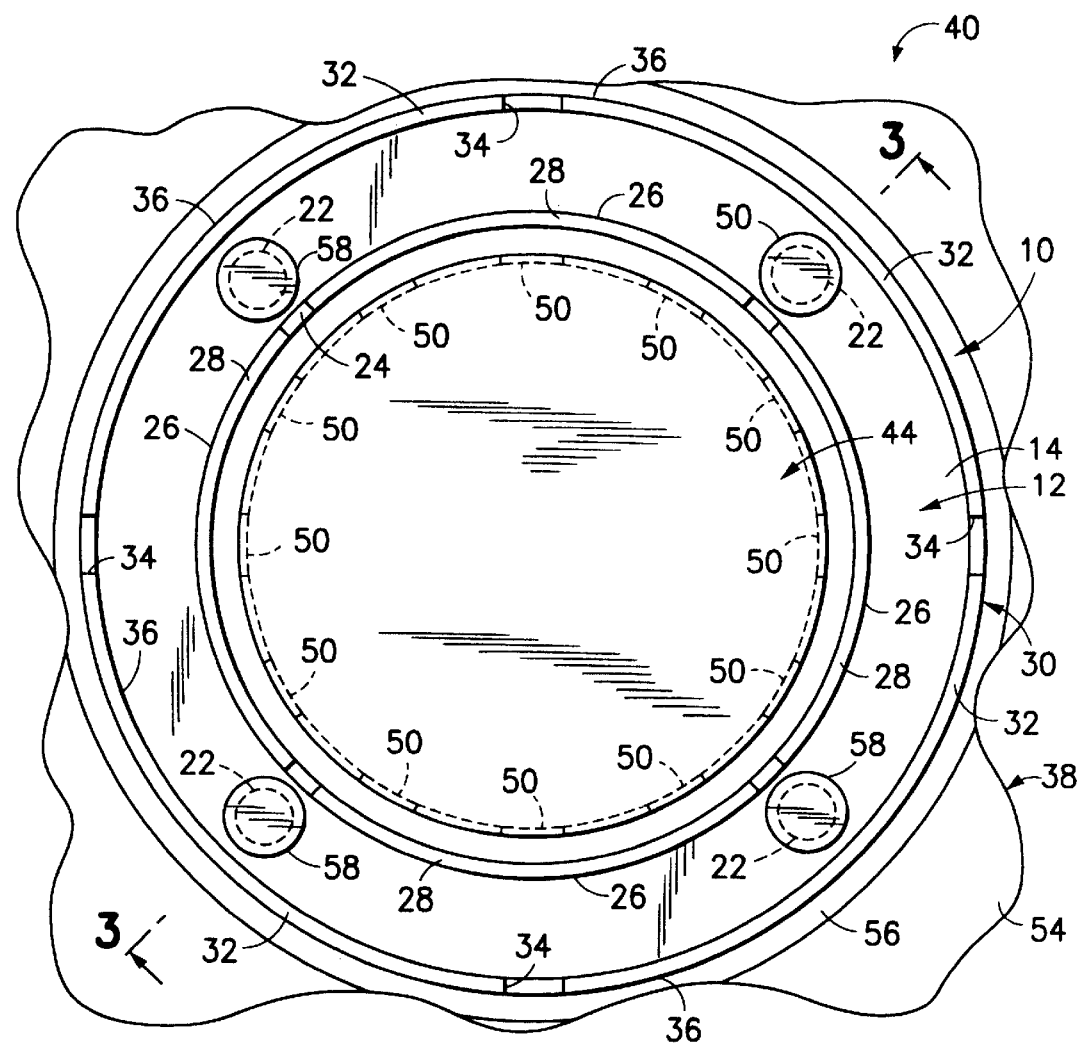
FIG. 2 is a top plan view, partially cut away, of an airbag module including the airbag deflection mount of FIG. 1.
Figure 3:
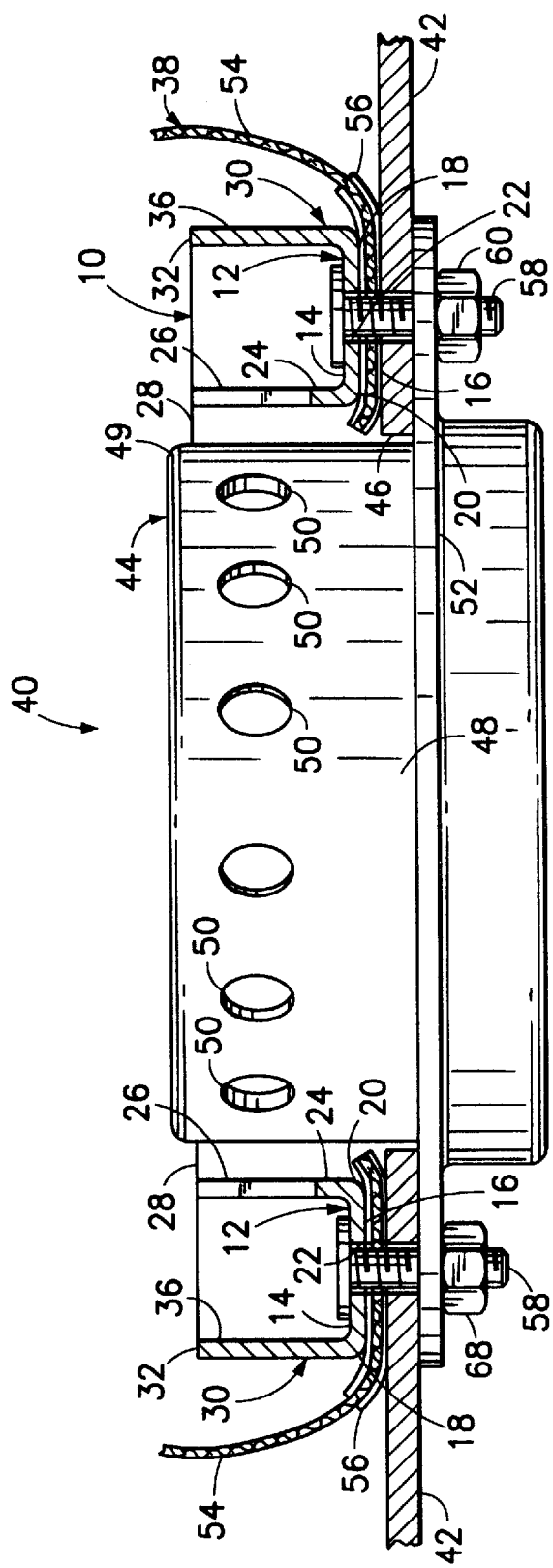
FIG. 3 is a sectional view of the airbag module of FIG. 2, taken along the line 3—3 of FIG. 2.
Figure 4:
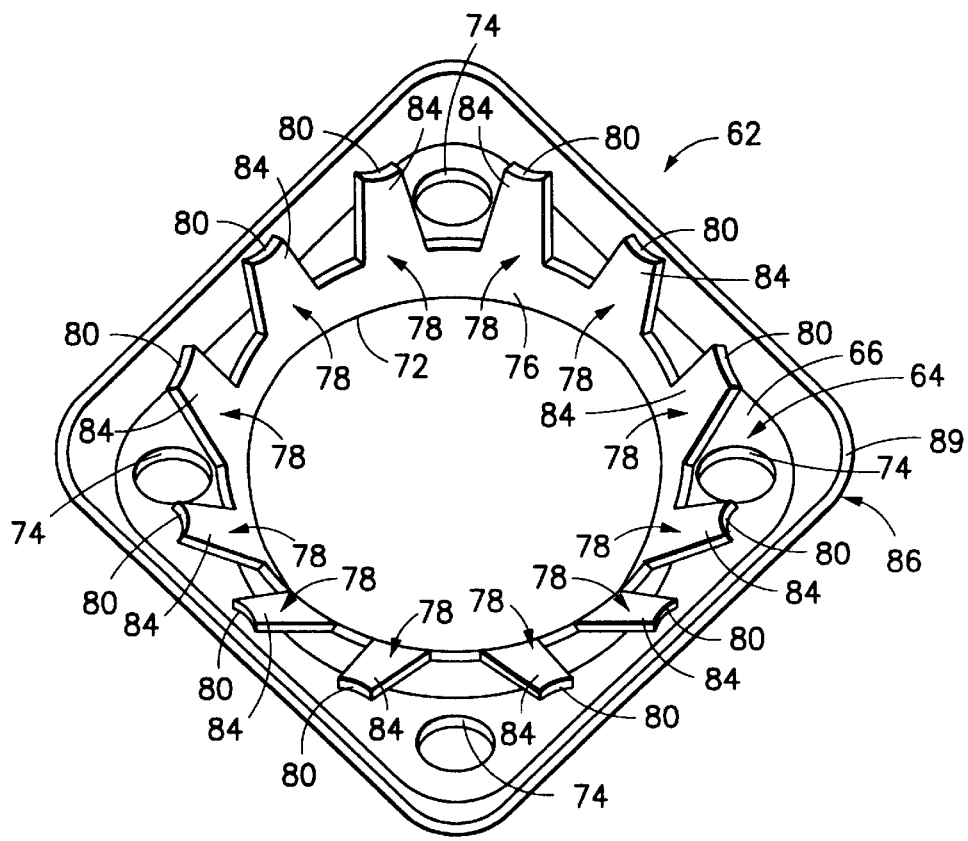
FIG. 4 is a perspective view of another airbag deflection mount according to the present invention.

Referring to FIG. 1, the present invention provides an airbag deflection mount 10 for mounting an airbag cushion 38 to an airbag module 40 as shown in FIGS. 2 and 3. The airbag deflection mount 10 is fabricated from a suitably rigid and strong material, such as reinforced nylon or a similar plastic for example, or metals such as steel or aluminum for example. The airbag deflection mount 10 includes a generally flat and circular retainer ring 12 having a top surface 14, a bottom surface 16, an outer edge 18 and an inner edge 20. The retainer ring 12 defines four equally spaced-apart fastener receiving openings 22. Alternatively, a plurality of bolts may be insert molded into the retainer ring 12, as is known in the art.

The airbag deflection mount 10 also includes a continuous, circular basewall 24 extending upwardly from and generally perpendicular to the top surface 14 of the retainer ring 12 adjacent the inner edge 20 of the retainer ring. Four spaced-apart deflectors 26 extend upwardly from the basewall 24, generally perpendicular to the retainer ring 12, to distal ends 28. Although the deflectors are unitary with the basewall, a broken line is provided between the deflectors and the basewall in FIG. 1 for illustration purposes. A circular outer wall 30 extends upwardly from and generally perpendicular to the top surface 14 of the retainer ring 12 adjacent an outer edge 18 of the retainer ring to a top edge 32. The outer wall 30 defines four spaced-apart cutouts 34 extending downwardly from the top edge 32 of the outer wall, and the four cutouts divide the outer wall into four spaced-apart baffles 36 which are offset from the four deflectors 26.

Referring to FIGS. 2 and 3, the airbag deflection mount 10 mounts the inflatable airbag cushion 38 to the airbag module 40 which also includes a module baseplate 42 and an inflator 44. The module baseplate 42 defines an inflator-receiving aperture 46 with a cylindrical inflator sidewall 48 of the inflator 44 extending therethrough, with the module baseplate below twelve spaced-apart inflation gas ports 50 defined by the inflator sidewall. The airbag inflator 44 has an inflator flange 52 extending radially outwardly from the sidewall and abutting the module baseplate 42. The airbag cushion 38 includes a throat 54 surrounding the inflator sidewall 48 and a collar 56 seated on the module baseplate 42 so that inflation gas from the inflator 44 will inflate the airbag cushion.

The airbag deflection mount 10 is received between the inflator sidewall 48 and the throat 54 of the airbag cushion 38, with the bottom surface 16 of the retainer ring 12 positioned on top of the collar 56 of the airbag cushion. Four bolts 58 pass through the fastener receiving holes 22 of the retainer ring 12, through the collar 56 of the airbag cushion 38, through the module baseplate 42 and through the inflator flange 52 and are fastened with four nuts 60 (only two are shown) to secure the airbag deflection mount 10, the airbag cushion and the inflator 44 to the module baseplate.

The continuous basewall 24 extends upwardly from the retainer ring 12 to below the twelve inflation ports 50 of the inflator 44, thereby not blocking the inflation ports. The four deflectors 26 are positioned between the inflator sidewall 48 and the throat 54 of the airbag cushion 38, with the distal ends 28 of the deflectors positioned between the inflation ports 50 and a top 49 of the inflator sidewall. Preferably, the deflectors 26 are positioned interposed between all twelve of the inflation ports 50 and the throat 54 of the airbag cushion 38. The top edge 32 of the outer wall 30 extends above the inflation ports 50, and the outer wall is also positioned interposed between the four deflectors 26 and the throat 54 of the airbag cushion 38.

As is known in the art, the airbag inflator 44 contains means for producing inflation gas, such as a solid pyrotechnic gas generant, for example. Generally, the inflatable airbag cushion 38 will inflate upon receiving inflation gas from the inflator 44 during a vehicle collision to provide a cushion between the vehicle occupant and interior portions of the vehicle. The inflation gas exits the inflator 44 through the twelve inflation ports 50 at a high pressure and temperature and can contain hot particles as a by-product of combustion within the inflator.

The four deflectors 26 of the airbag deflection mount 10 substantially deflect and diffuse the hot inflation gas and solid particles exiting the twelve inflation ports 50 of the inflator 44. The deflectors 26 deflect some of the inflation gas axially, with respect to the inflator 44, into the airbag cushion 38, while some of the inflation gas passes radially between the deflectors 26. The surrounding baffles 36 then substantially deflect and diffuse the hot inflation gas and solid particles passing radially between the deflectors 26. The baffles 36 deflect some of the inflation gas axially, with respect to the inflator 44, into the airbag cushion 38, while some of the inflation gas passes radially through the cutouts 34 into the airbag cushion. The baffles 36 and the deflectors 26, accordingly, cooperate to knock down a substantial amount of any solid particles and protect the throat 54 of the airbag cushion 38 from the hot inflation gas. The baffles 36 and the deflectors 26, however, allow some of the inflation gas to radially enter the airbag cushion 38 to encourage even inflation of the airbag cushion.

It should be noted that the number of baffles 36 of the airbag deflection mount 10 does not have to equal the number of deflectors 26, as long as there is always either a baffle or a deflector interposed between each of the inflation ports 50 of the inflator 44 and the throat 54 of the airbag cushion 38. In addition, inflators typically can be provided with anywhere between eight and twenty-four inflation ports, and the airbag deflection mount 10, therefore, can also be provided with more than four deflectors 26 and more than four baffles 36.

Referring to FIGS. 4 through 7, another airbag deflection mount 62 according to the present invention is shown. The airbag deflection mount 62 includes a generally flat retainer ring 64 having a top surface 66, a bottom surface 68, a generally rectangular outer edge 70 and a circular inner edge 72. The retainer ring 64 defines four equally spaced-apart fastener receiving openings 74.

Figures 6, 7:
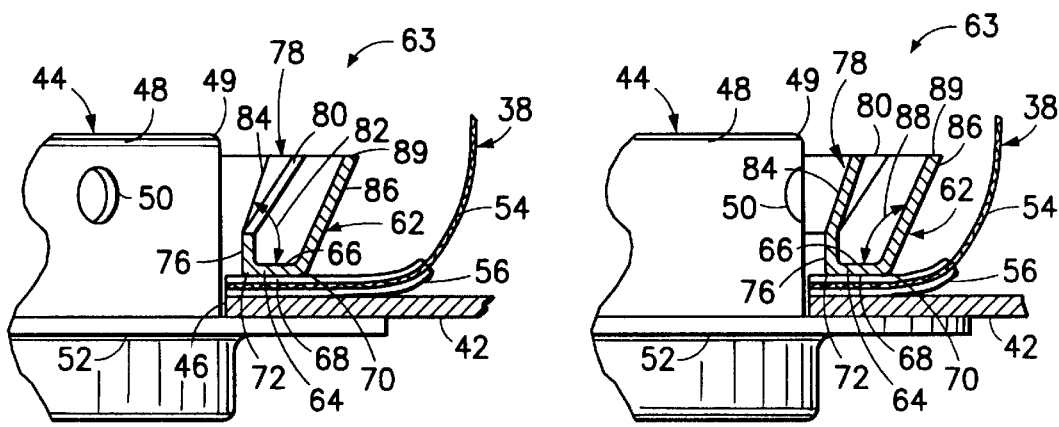
FIG. 6 is a fragmentary sectional view of the airbag module of FIG. 5, taken along the line 6—6 of FIG. 5.
FIG. 7 is a fragmentary sectional view of the airbag module of FIG. 5, taken along the line 7—7 of FIG. 5.

The airbag deflection mount 62 also includes a continuous, circular basewall 76 extending upwardly from and generally perpendicular to the top surface 66 of the retainer ring 64 adjacent the inner edge 72 of the retainer ring. Twelve spaced-apart deflectors 78 extend upwardly from the basewall 76 to distal ends 80. The deflectors 78 each slope substantially outwardly with respect to the retainer ring 64. By substantially outwardly it is meant that each deflector 78 slopes outwardly at an angle 82 of between about sixty (60) and about eighty (80) degrees with respect to the retainer ring 64, and preferably about seventy (75) degrees with respect to the retainer ring as shown in FIG. 6. In addition, each of the deflectors 78 has an inwardly facing transverse convex surface 84. A continuous, generally rectangular outer wall 86 extends upwardly from the top surface 66 of the retainer ring 64 adjacent the outer edge 70 of the retainer ring to a top edge 89 of the outer wall. The outer wall 86 slopes substantially outwardly with respect to the retainer ring 64. By substantially outwardly it is meant that the outer wall 86 slopes outwardly at an angle 88 of between about one hundred (100) and about one hundred and twenty five (125) degrees with respect to the retainer ring 64, and preferably about one hundred and fifteen (115) degrees with respect to the retainer ring as shown in FIG. 7.

Figure 5:
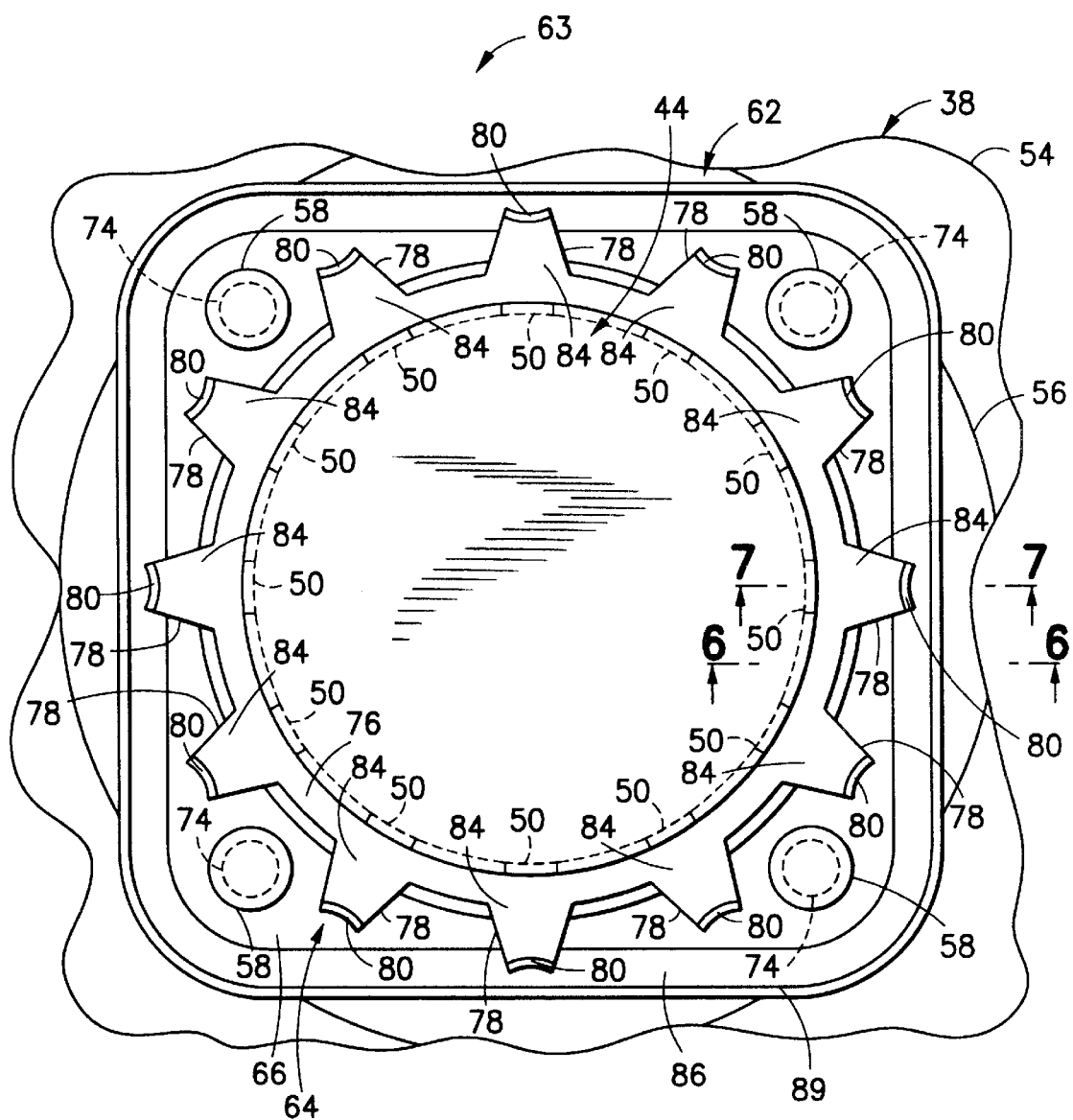
FIG. 5 is a top plan view, partially cut away, of an airbag module including the airbag deflection mount of FIG. 4.
Figure 8:
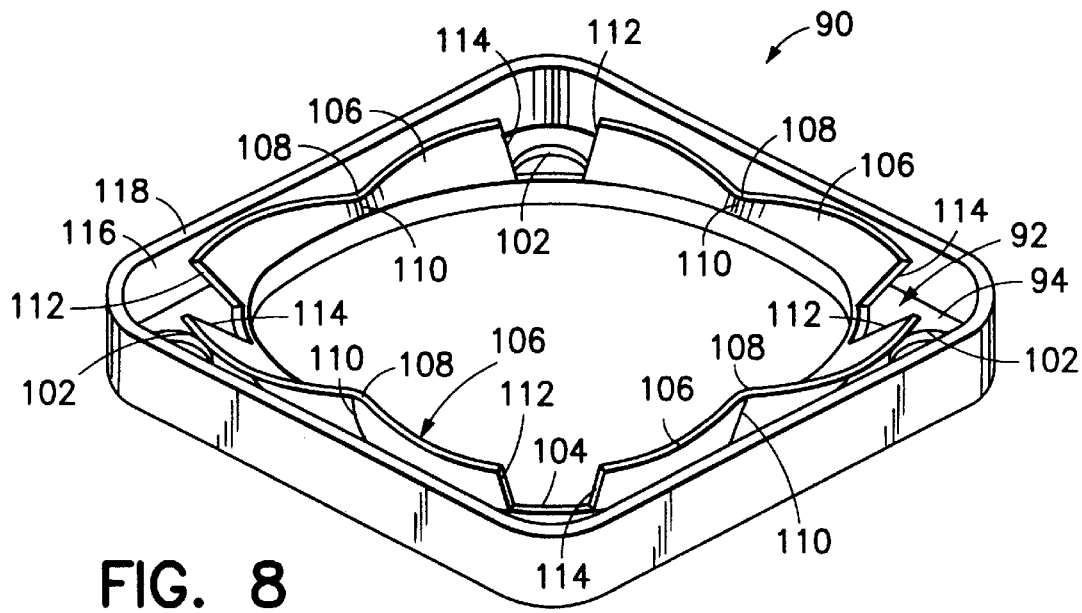
FIG. 8 is a perspective view of an additional airbag deflection mount according to the present invention.
Figure 9:
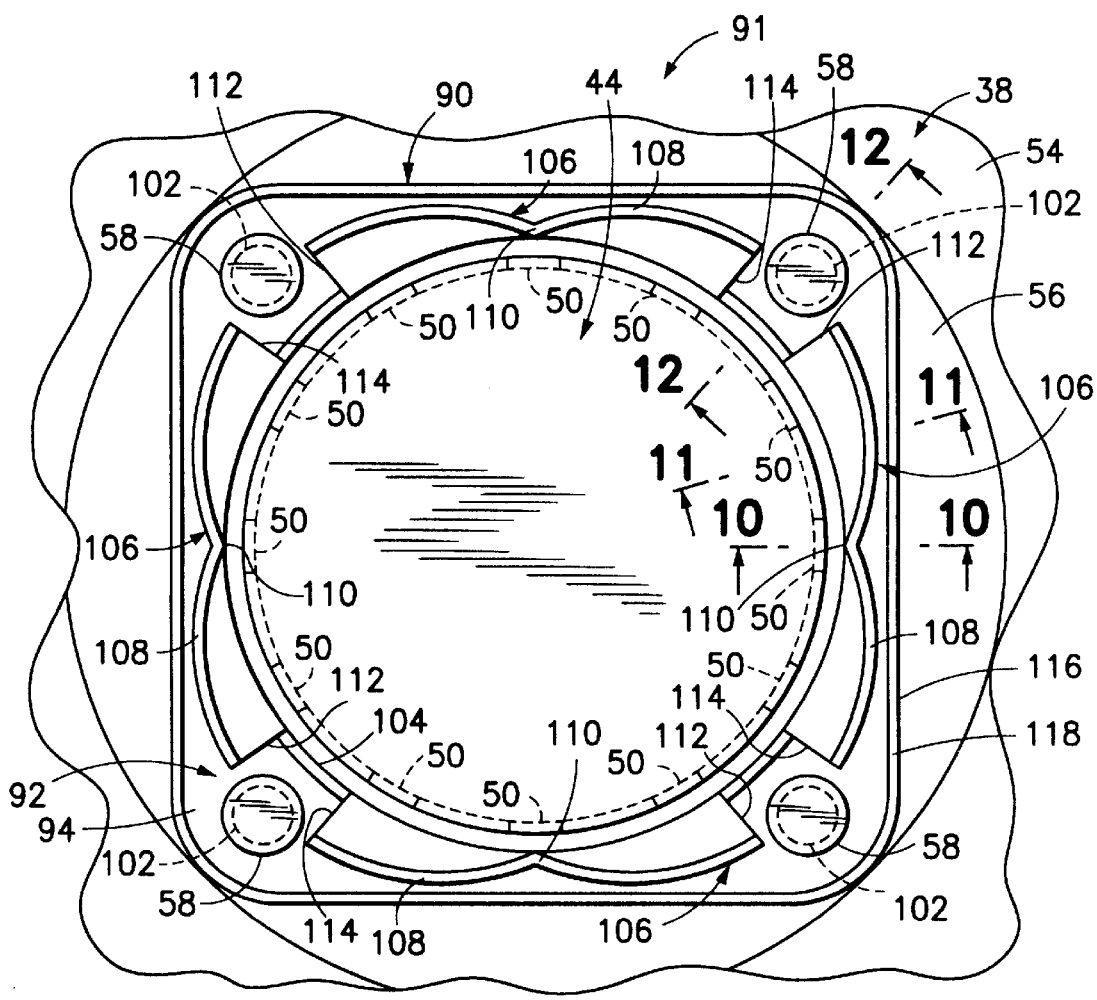
FIG. 9 is a top plan view, partially cut away, of an airbag module including the airbag deflection mount of FIG. 8.
Figure 10:
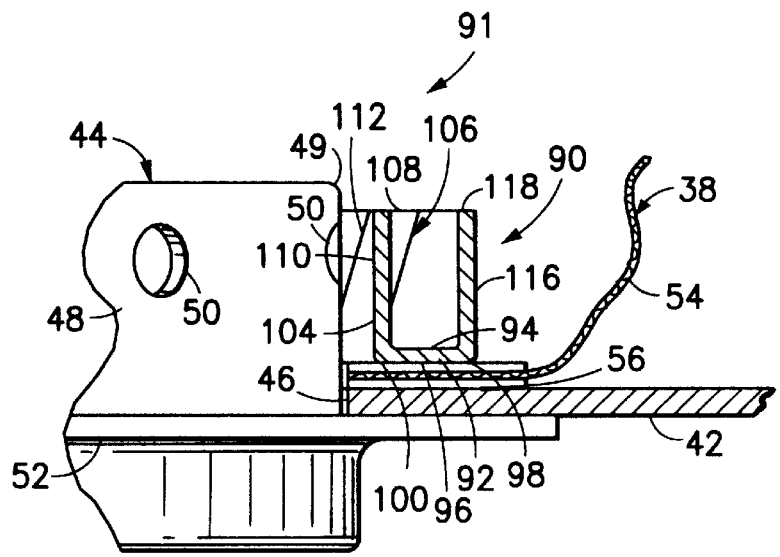
FIG. 10 is a fragmentary sectional view of the airbag module of FIG. 9, taken along the line 10—10 of FIG. 9.
Figure 11:
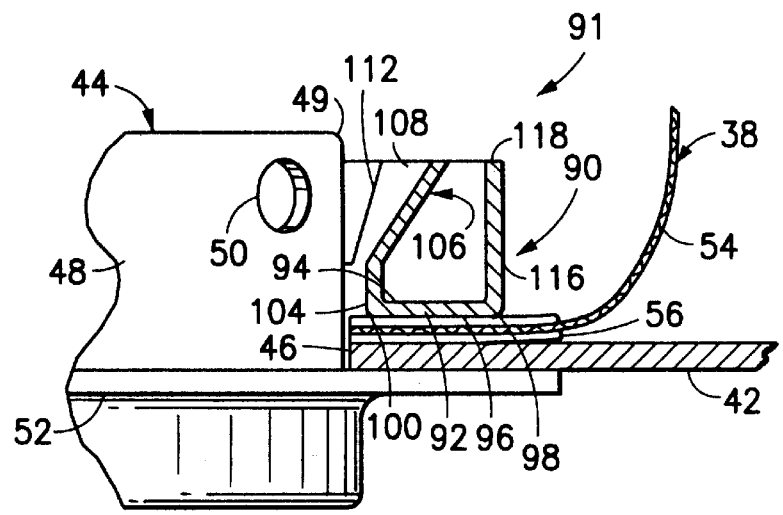
FIG. 11 is a fragmentary sectional view of the airbag module of FIG. 9, taken along the line 11—11 of FIG. 9.

Referring to FIGS. 5 through 7, the airbag deflection mount 62 is shown mounted to an airbag module 63 which is similar to the airbag module 40 of FIGS. 2 and 3, and elements of the airbag modules which are the same have the same reference numeral. The airbag deflection mount 62 is received between the inflator sidewall 48 and the throat 54 of the airbag cushion 38, with the bottom surface 68 of the retainer ring 64 positioned on top of the collar 56 of the airbag cushion. The four bolts 58 pass through the fastener receiving openings 22 of the retainer ring 64, through the collar 56 of the airbag cushion 38, through the module baseplate 42 and through the inflator flange 52 and are fastened with the four nuts (not shown) to secure the airbag deflection mount 62, the airbag cushion and the airbag inflator 44 to the module baseplate.

The continuous basewall 76 extends upwardly from the retainer ring 64 to below the twelve inflation ports 50 of the inflator 44, thereby not blocking the inflation ports. The twelve deflectors 78 are aligned with and positioned interposed between the twelve inflation ports 50 and the throat 54 of the airbag cushion 38, with the distal ends 80 of the deflectors positioned between the inflation ports and a top 49 of the inflator sidewall 48. The top edge 89 of the outer wall 86 extends above the inflation ports 50, and the outer wall is positioned between the deflectors 78 and the throat 54 of the airbag cushion 38.

The twelve deflectors 78 of the airbag deflection mount 62 substantially deflect and diffuse the hot inflation gas and solid particles exiting the twelve inflation ports 50 of the inflator 44. The transverse convex surfaces 84 of the outwardly sloping deflectors 78 deflect some of the inflation gas axially, with respect to the inflator 44, into the airbag cushion 38, while some of the inflation gas passes radially away from the inflator between the deflectors. The surrounding outwardly sloping outer wall 86 then substantially deflects and diffuses any of the hot inflation gas and hot particles passing radially between the deflectors 78. The outer wall 86 deflects some of the inflation gas axially, with respect to the inflator 44, and some of the inflation gas radially into the airbag cushion 38. The outer wall 86 and the deflectors 78, accordingly, cooperate to knock down a substantial amount of the hot particles and protect the throat 54 of the airbag cushion 38 from the hot inflation gas. The outer wall 86 and the deflectors 78, however, allow some of the inflation gas to radially enter the airbag cushion 38 to encourage even inflation of the airbag cushion.

Referring to FIGS. 8 through 12, an additional airbag deflection mount 90 according to the present invention is shown. The airbag deflection mount 90 includes a generally flat retainer ring 92 having a top surface 94, a bottom surface 96, a generally rectangular outer edge 98 and a circular inner edge 100. The retainer ring 92 defines four equally spaced-apart fastener receiving openings 102.

Figure 12:
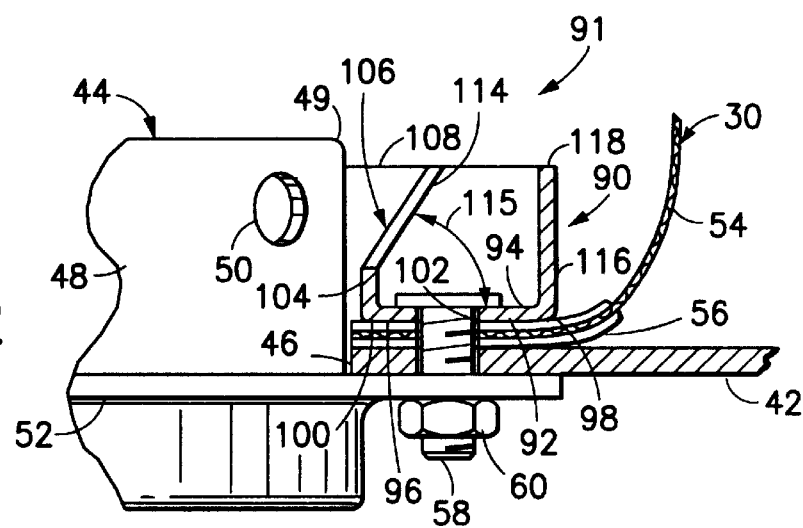
FIG. 12 is a fragmentary sectional view of the airbag module of FIG. 9, taken along the line 12—12 of FIG. 9.

The airbag deflection mount 90 also includes a continuous, circular basewall 104 extending upwardly from and generally perpendicular to the top surface 94 of the retainer ring 92 adjacent the inner edge 100 of the retainer ring. Four spaced-apart deflectors 106 extend upwardly from the basewall 104 to distal ends 108. Each of the deflectors 106 are elongated with respect to the height of the deflectors. The distal ends 108 of each of the four deflectors 106 flare outwardly from a center 110 of the deflector to opposing side edges 112,114. The center 110 of each deflector 106 is perpendicular with respect to the retainer ring 92 while the opposing side edges 112,114 slope substantially outwardly with respect to the retainer ring. By substantially outwardly it is meant that the side edges 112,114 each slope outwardly at an angle 115 of between about fifty (50) and about seventy five (75) degrees with respect to the retainer ring 92, and preferably about sixty (60) degrees with respect to the retainer ring as shown in FIG. 12. A continuous, generally rectangular outer wall 116 extends upwardly from and generally perpendicular to the top surface 94 of the retainer ring 92 adjacent the outer edge 98 of the retainer ring to a top edge 118 of the outer wall.

Referring to FIGS. 9 through 12, the airbag deflection mount 90 is shown mounted to an airbag module 91 similar to the airbag module 40 of FIGS. 2 and 3, and elements of the airbag modules which are the same have the same reference numeral. The airbag deflection mount 90 is received between the inflator sidewall 48 and the throat 54 of the airbag cushion 38, with the bottom surface 96 of the retainer ring 92 positioned on top of the collar 56 of the airbag cushion 38. The four bolts 58 pass through the fastener receiving openings 102 of the retainer ring, through the collar 56 of the airbag cushion 38, through the module baseplate 42 and through the inflator flange 52 and are fastened with the four nuts 60 (only one is shown) to secure the airbag deflection mount 90, the airbag cushion and the airbag inflator 44 to the module baseplate.

The continuous basewall 104 extends upwardly from the retainer ring 92 to below the twelve inflation ports 50 of the inflator 44, thereby not blocking the inflation ports. The four deflectors 106 are positioned between the inflator sidewall 48 and the throat 54 of the airbag cushion 38, with the distal ends 108 of the deflectors positioned between the inflation ports 50 and a top 49 of the inflator sidewall. Preferably, a deflector 106 is positioned interposed between each of the twelve inflation ports 50 and the throat 54 of the airbag cushion 38. The top edge 118 of the outer wall 116 extends above the inflation ports 50 and the outer wall is also positioned interposed between the four deflectors 106 and the throat 54 of the airbag cushion 38.

The four deflectors 106 of the airbag deflection mount 90 substantially deflect and diffuse the hot inflation gas and solid particles exiting the twelve inflation ports 50 of the inflator 44. The deflectors 106 deflect some of the inflation gas axially, with respect to the inflator 44, into the airbag cushion 38, and deflect some of the inflation gas radially, with respect to the inflator, into the airbag cushion. Some of the inflation gas also passes radially away from the inflator 44 between the deflectors 106. The surrounding outer wall 116 then substantially deflects and diffuses the hot inflation gas and solid particles passing radially between the deflectors 106 axially with respect to the inflator 44, into the airbag cushion 38. The outer wall 116 and the deflectors 106, accordingly, cooperate to knock down a substantial amount of the solid particles and protect the throat 54 of the airbag cushion 38 from the hot inflation gas, yet allow some of the inflation gas to radially enter the airbag cushion to encourage even inflation of the airbag cushion.

It should be noted that the outer edge 98 of the retainer ring 92 and the outer wall 116 of the airbag deflection mount 90 can each be circular instead of rectangular. There are advantages to both a circular and a rectangular outer wall. A circular outer wall provides better diffusion of inflation gas, whereas a rectangular outer wall provides a more compact airbag deflection mount while still allowing easy access to the fastener receiving openings in the corners. Each of the airbag deflection mounts 10,62,90 described above can be provided with either a circular or a rectangular outer wall. In addition, the outer walls can either be perpendicular to the retainer ring or can slope substantially outwardly with respect to the retainer ring.

The present invention, therefore, provides airbag deflection mounts 10,62,90 that protect the airbag cushion 38 from burning, yet directs inflation gas into the airbag cushion in such a way as to encourage even inflation of the airbag cushion.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An airbag deflection mount for mounting an airbag cushion to an airbag module, the airbag module also including an inflator having an inflator sidewall defining a plurality of spaced apart inflation ports, and a module baseplate surrounding the inflator sidewall below the plurality of inflation ports, with the airbag cushion including a throat surrounding the inflator sidewall and having a collar seated on the module baseplate so that inflation gas exiting the inflation ports of the inflator will inflate the airbag cushion, the airbag deflection mount comprising:

a retainer ring receivable on the collar of the airbag cushion, the retainer ring securable to the module baseplate with the collar of the airbag cushion clamped therebetween; and a plurality of circumferentially spaced-apart deflectors which, when the retainer ring is secured to the module baseplate, extend upwardly from the retainer ring to distal ends positioned between a top of the inflator sidewall and the plurality of inflation ports, with the plurality of deflectors deployed interposed between the inflator sidewall and the throat of the airbag cushion to deflect a substantial portion of hot inflation gas and hot particles exit the plurality of inflation ports of the inflator axially away from the throat of the airbag cushion while a lesser portion of the inflation gas passes radially past the spaced-apart deflectors to radially enter the airbag.

2. An airbag deflection mount according to claim 1 wherein the retainer ring is generally flat and the plurality of spaced-apart deflectors are perpendicular to the retainer ring.

3. An airbag deflection mount according to claim 1 wherein the plurality of spaced-apart deflectors are equal in number to the plurality of inflation ports and positioned so that when the retainer ring is secured to the baseplate the plurality of spaced-apart deflectors are interposed between the plurality of spaced-apart inflation ports and the throat of the airbag cushion.

4. An airbag deflection mount according to claim 3 wherein the retainer ring is generally flat and each of the plurality of deflectors substantially slopes upwardly and outwardly with respect to the retainer ring.

5. An airbag deflection mount according to claim 4 wherein each of the plurality of deflectors has a transverse convex surface for facing the inflation ports.

6. An airbag deflection mount according to claim 1 wherein the plurality of deflectors comprise four deflectors and each of the four deflectors is elongated with respect to the height of the deflectors, the distal ends of each of the four deflectors flare upwardly from the retainer ring and outwardly from a centerline of the retainer ring to opposing inclined side edges.

7. An airbag deflection mount according to claim 1 further comprising:
an outer wall extending upwardly from the retainer ring to a top edge above the plurality of inflation ports, the outer wall surrounding the plurality of deflectors for substantially deflecting any hot inflation gas and solid particles passing between the plurality of deflectors.

8. An airbag deflection mount according to claim 7 wherein the outer wall defines a plurality of spaced-apart cutouts extending downwardly from the top edge of the outer wall to the below the plurality of inflation ports, the spaced-apart cutouts dividing the outer wall into a plurality of spaced-apart baffles offset from the plurality of deflectors.

9. An airbag deflection mount according to claim 7 wherein the retainer ring is generally flat and the outer wall slopes substantially upwardly from the retainer ring and outwardly from a centerline the retainer ring.

10. An airbag deflection mount according to claim 1 further comprising:
a continuous basewall extending upwardly from the retainer ring, with the plurality of deflectors extending upwardly from the basewall.

11. An airbag module comprising:
A) an inflator having a sidewall defining a plurality of spaced-apart inflation ports;
B) a module baseplate surrounding the inflator sidewall below the plurality of inflation ports;
C) an airbag cushion including a throat surrounding the inflator sidewall and having a collar received on the module baseplate so that inflation gas exiting the inflation ports will inflate the airbag cushion; and
D) an airbag deflection mount including,
a retainer ring received over the collar of the airbag cushion and fastened to the module baseplate with the collar of the airbag cushion clamped therebetween, and
a plurality of circumferentially spaced-apart deflectors extending upwardly from the retainer ring to distal ends between the plurality of inflation ports and a top of the inflator sidewall, the plurality of spaced-apart deflectors positioned between the inflator sidewall and the throat of the airbag cushion to deflect a substantial portion of hot inflation gas and solid particles exiting the plurality of inflation ports of the inflator axially away from the throat of the airbag cushion while a lesser portion of the inflation gas passes radially past the spaced-apart deflectors to radially enter the airbag.

12. An airbag module according to claim 11 wherein the retainer ring of the airbag deflection mount is generally flat and the plurality of spaced-apart deflectors are perpendicular to the retainer ring.

13. An airbag module according to claim 11 wherein the plurality of spaced-apart deflectors of the airbag deflector mount are equal in number to and aligned with the plurality of inflation ports.

14. An airbag module according to claim 13 wherein the retainer ring of the airbag deflector mount is generally flat and each of the plurality of deflectors substantially slopes upwardly and outwardly with respect to the retainer ring.

15. An airbag module according to claim 14 wherein each of the plurality of deflectors of the airbag deflection mount has a transverse convex surface facing the inflation ports.

16. An airbag module according to claim 11 wherein the plurality of deflectors of the airbag deflection mount comprise four deflectors and each of the four deflectors is elongated with respect to the height of the deflectors, the distal ends of each of the four deflectors flare upwardly from the retainer ring and outwardly from a centerline of the retainer ring.

17. An airbag module according to claim 11 wherein the airbag deflection mount further includes an outer wall extending upwardly from the retainer ring to a top edge above the plurality of inflation ports, the outer wall positioned between the plurality of deflectors and the throat of the airbag cushion to substantially deflect and diffuse any of the hot inflation gas and solid particles passing between the plurality of deflectors.

18. An airbag module according to claim 17 wherein the outer wall of the airbag deflection mount defines a plurality of spaced-apart cutouts extending downwardly from the top edge of the outer wall to below the plurality of inflation ports, the spaced-apart cutouts dividing the outer wall into a plurality of spaced-apart baffles offset from the plurality of deflectors.

19. An airbag module according to claim 17 wherein the retainer ring is generally flat and the outer wall of the airbag deflection mount slopes substantially upwardly from the retainer ring and outwardly from a centerline of the retainer ring.

20. An airbag module according to claim 11 wherein the airbag deflection mount further comprises a continuous basewall extending upwardly from the retainer ring to below the plurality of inflation ports, with the plurality of deflectors extending upwardly from the basewall.

* * * * *